(12) United States Patent
Zugaza Fernandez

(10) Patent No.: US 7,287,808 B2
(45) Date of Patent: Oct. 30, 2007

(54) FOLDING CLOSURE FOR CARGO CONTAINERS

(75) Inventor: Juan Manuel Zugaza Fernandez, Imarcoain (ES)

(73) Assignee: Mecadetol, S.A., Imarcoain (Navarra) (ES)

( * ) Notice: Subject to any disclaimer, the term of this patent is extended or adjusted under 35 U.S.C. 154(b) by 0 days.

(21) Appl. No.: 11/404,883

(22) Filed: Apr. 17, 2006

(65) Prior Publication Data

US 2006/0232103 A1 Oct. 19, 2006

(30) Foreign Application Priority Data

Apr. 19, 2005 (ES) ............................... 200500932

(51) Int. Cl.
*B60J 5/06* (2006.01)

(52) U.S. Cl. .................. 296/186.2; 296/186.4

(58) Field of Classification Search ............. 296/186.2, 296/186.4, 186.1, 83, 138, 142, 143, 144, 296/100.18, 100.11, 100.12, 100.14; 160/84.06, 160/123, 349.1
See application file for complete search history.

(56) References Cited

U.S. PATENT DOCUMENTS

| | | | | |
|---|---|---|---|---|
| 4,826,236 A | * | 5/1989 | Bennett | 296/186.2 |
| 4,943,110 A | * | 7/1990 | Pastva | 296/186.2 |
| 4,952,009 A | * | 8/1990 | Mountz et al. | 296/186.2 |
| 5,022,702 A | * | 6/1991 | Straub et al. | 296/186.2 |
| 5,215,349 A | * | 6/1993 | Horton | 296/186.2 |
| 5,282,663 A | * | 2/1994 | Horton | 296/186.2 |
| 6,474,720 B1 | * | 11/2002 | Fliege et al. | 296/186.2 |
| 6,612,638 B1 | * | 9/2003 | Fliege et al. | 296/138 |
| 6,779,832 B2 | * | 8/2004 | D'Assumcao | 296/155 |
| 2001/0042994 A1 | * | 11/2001 | Than | 296/143 |
| 2005/0231004 A1 | * | 10/2005 | Remmel et al. | 296/186.2 |

* cited by examiner

*Primary Examiner*—Jason S Morrow
(74) *Attorney, Agent, or Firm*—The Nath Law Group; Jerald L. Meyer; Matthew J. Moffa

(57) ABSTRACT

A folding closure for cargo containers, formed by a tarp (3) arranged on rails (1) defining V-shaped tracks on which top and bottom carriages joined to the tarp (3) and top and bottom carriages incorporated on respective terminal profiles (7) arranged on the ends of the tarp (3) rest when running, by means of corresponding wheels.

6 Claims, 16 Drawing Sheets

FOLDING CLOSURE FOR CARGO CONTAINERS

FIELD OF THE ART

The invention is related to closure covers which are used in truck and trailer cargo containers, proposing a folding closure with structural features improving functionality.

STATE OF THE ART

Truck and trailer cargo containers may be exposed or closed with covers, using permanent covers on occasion, but in other cases it is necessary to be able to remove the closure for loading and unloading operations, or for having direct access to the cargo located within, to which end moving or removable covers are used.

In this sense moving covers are known that allow their movement to leave the corresponding side of the cargo container open, for example by means of a solution of tarps arranged in a guided assembly on rails, with the possibility of movement thereof for a folding in an end position of the application assembly.

Due to the length of the assembly rails and the weight of the incorporated tarps, as well as due to temperature variations, said assembly rails of the tarps experience buckling, making the sliding movement of the tarps difficult, even being able to cause said movement of the tarps to lock.

OBJECT OF THE INVENTION

According to the present invention a folding closure is proposed, having a sliding tarp with assembly features that effectively solve the problems of tarp movement difficulty, such that an advantageous functionality with respect to conventional assemblies is obtained.

This closure object of the invention consists of two parallel longitudinal rails, a bottom one and a top one, which are fixed to the frame of the application cargo container, running carriages arranged fastened on the tarp and end carriages which are arranged coupled with respect to terminal profiles incorporated on the ends of the tarp being incorporated on each one of said rails.

The rails of the assembly are made up of profiles defining V-shaped running tracks both in the bottom portion and the top portion, in which tracks the carriages of the tarp and the carriages of the end closure profiles are coupled by means of wheels, such that said wheels of the carriages establish two point supports on the V-shaped paths which are determined by the tracks.

A rolling assembly with very little friction is thus obtained, since the wheels rest on the rolling paths only at two contact points, while the arrangement of this assembly defines a permanent contact of the wheels on the running paths in any position, favoring the jam-free sliding although the carriages experience lateral or longitudinal inclinations.

The terminal profiles which are incorporated at the ends of the tarp define a longitudinal groove in which a closure mechanism is arranged fitted, such that said mechanism may be slid in order to place it at the desired height, being fixed in the corresponding position by means of screws.

Said terminal profiles of the tarp define at one of its edges a housing in which the coupling of the tarp by means of insertion with a capturing conduit is established, whereas a resilient sealing is arranged on the other edge to form the support of the closure.

The end carriages of the sliding assembly are arranged on the top and bottom of said terminal profiles of the tarp, the bottom carriage being fixed by means of screws or a similar solution on the corresponding profile, whereas the top carriage is arranged freely fitted, forming a floating coupling with respect to the profile, which allows compensating the longitudinal buckling of the rails, maintaining the sliding freedom in the movements.

The profiles making up the assembly rails have on the outer lateral side a longitudinal groove in which a protective device against blows is arranged on the bottom rail of the assembly; said profiles of the rails further defining on the same outer lateral side a cavity defining a housing, in which a cover skirt is incorporated on the top rail to prevent rainwater from entering through the assembly into the application cargo container.

Given that the tarp of the assembly is susceptible to longitudinal expansion by use and as a result of temperature changes, the incorporation of an accessory supplement is provided for at the fixed latching part of the closure mechanisms of the ends, by means of which an latching is defined that allows compensating the expansion so that the tarp remains taut when the closure is formed.

With the foregoing, the assembly of the proposed closure results from certainly advantageous features for its function, acquiring its own life and a preferred character with respect to the conventional assemblies of the same application.

DETAILED DESCRIPTION OF THE INVENTION

Figure 1:
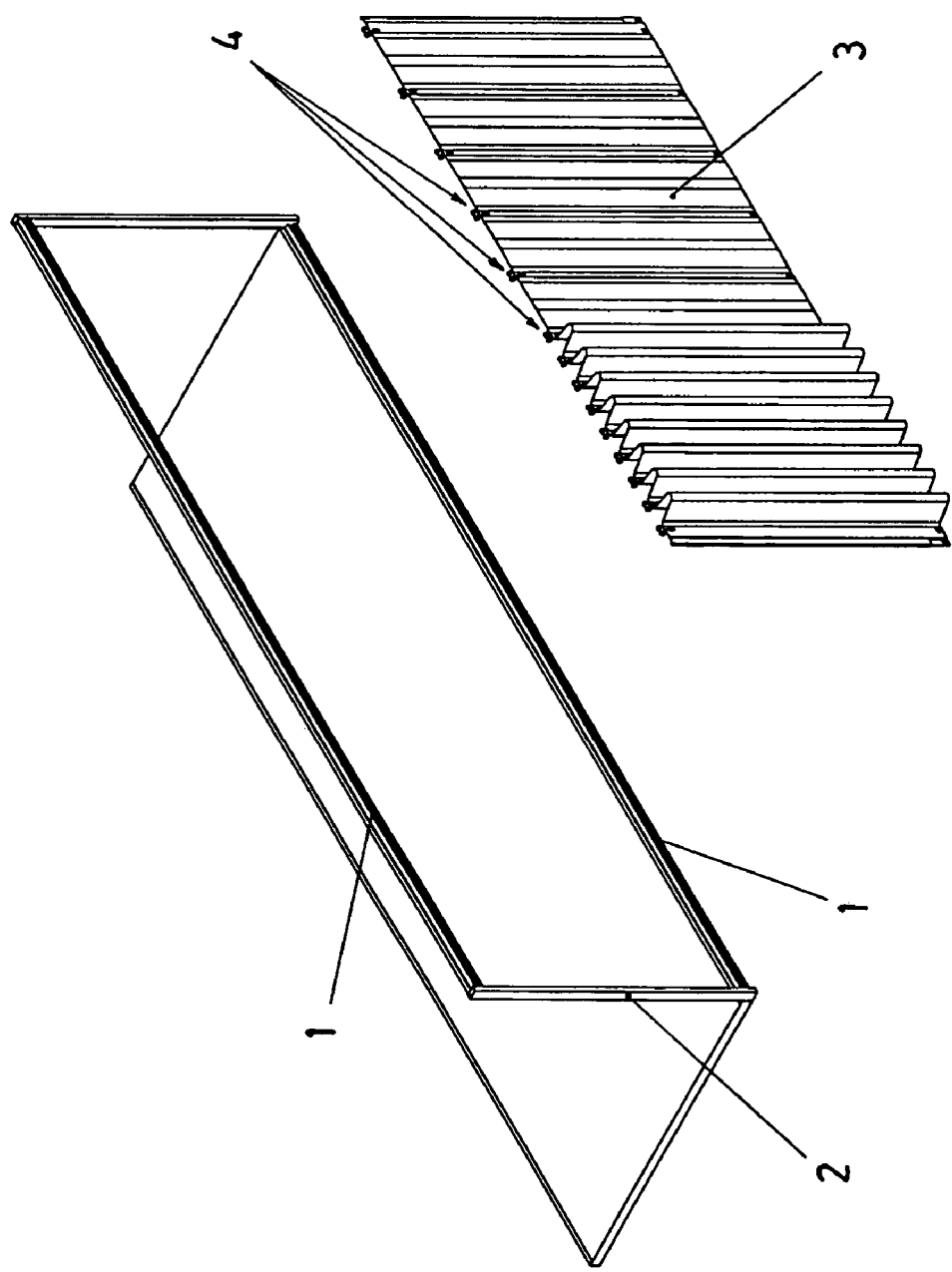
FIG. 1 shows an exploded perspective view of the arrangement of a closure tarp with respect to the chassis of a cargo container, according to the assembly of the invention.
Figure 2:
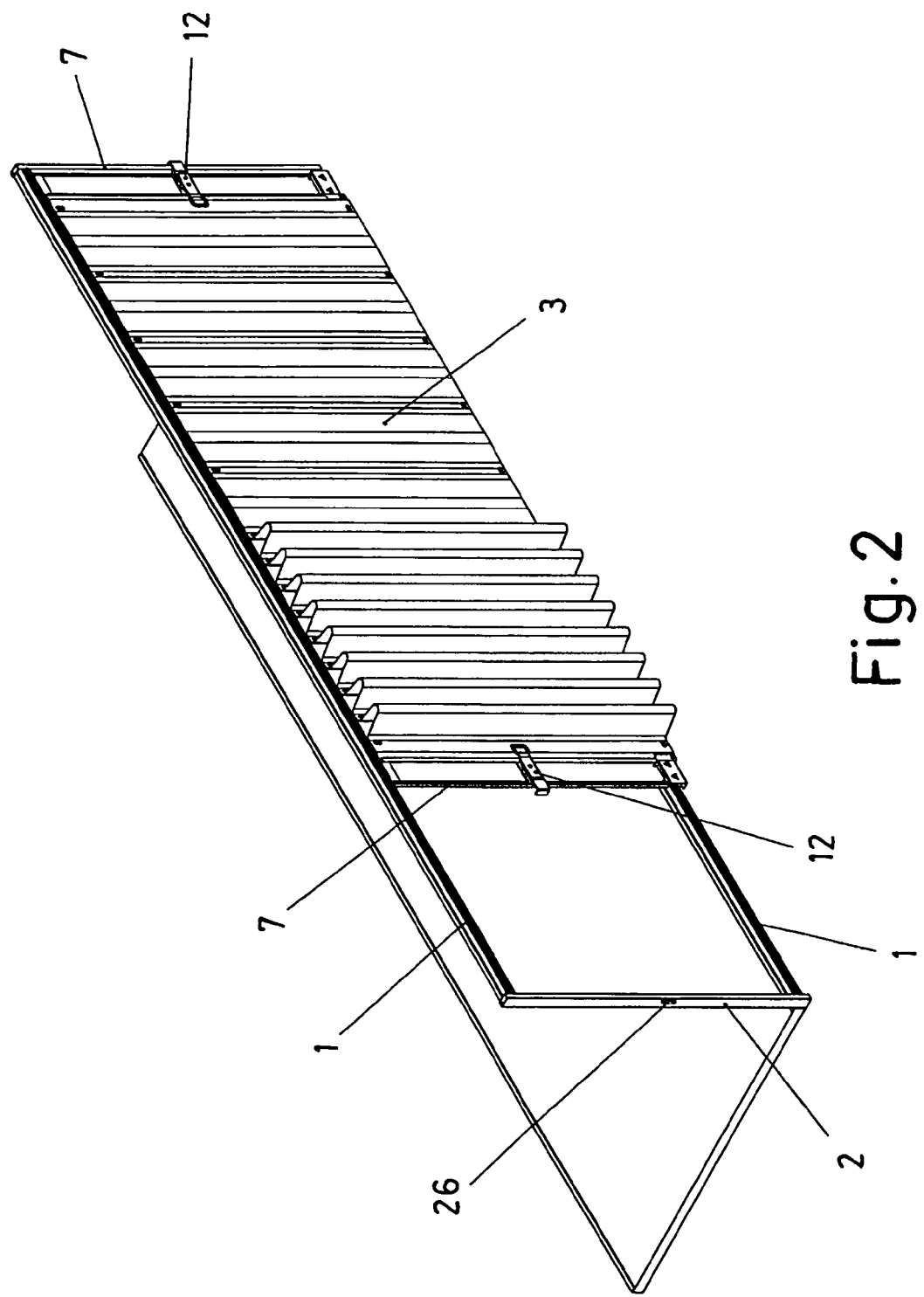
FIG. 2 shows a perspective view of the assembly of the previous figure assembled.

The object of the invention relates to a folding closure for truck or trailer cargo containers with assembly features making it particularly advantageous in its operation.

The proposed closure consists of two longitudinal rails (1) which are arranged fixed on the chassis (2) of the application cargo container, one in a top position and the other one in a bottom position, with respect to which rails (1) a tarp (3) susceptible to folding is arranged in a sliding assembly.

The assembly of the tarp (3) on the rails (1) is established by means of running carriages (4 and 5), which are arranged fixed on the top part and the bottom part of the tarp (3), respectively, being coupled on the rails (1) by means of wheels (6) which move inside them.

Further incorporated at the ends of the tarp (3) are terminal profiles (7) on which respective top carriages (8) and respective bottom carriages (9) are arranged in turn, which are also coupled in a running assembly on the rails (1) by means of corresponding wheels (6).

Figure 20:
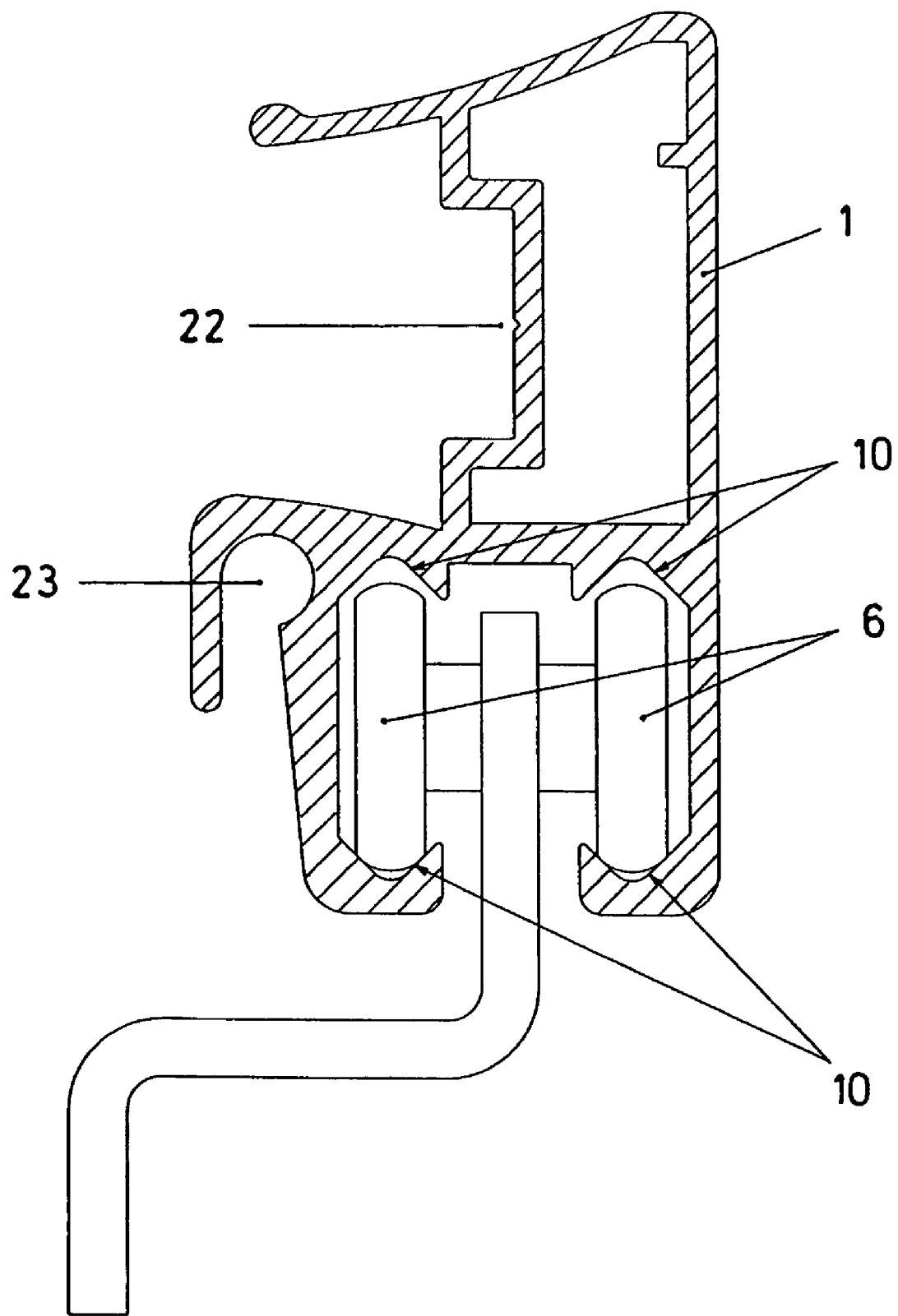
FIG. 20 shows a sectioned view of a rail of the assembly according to the invention with a running carriage arranged in a normal position.
Figure 21:
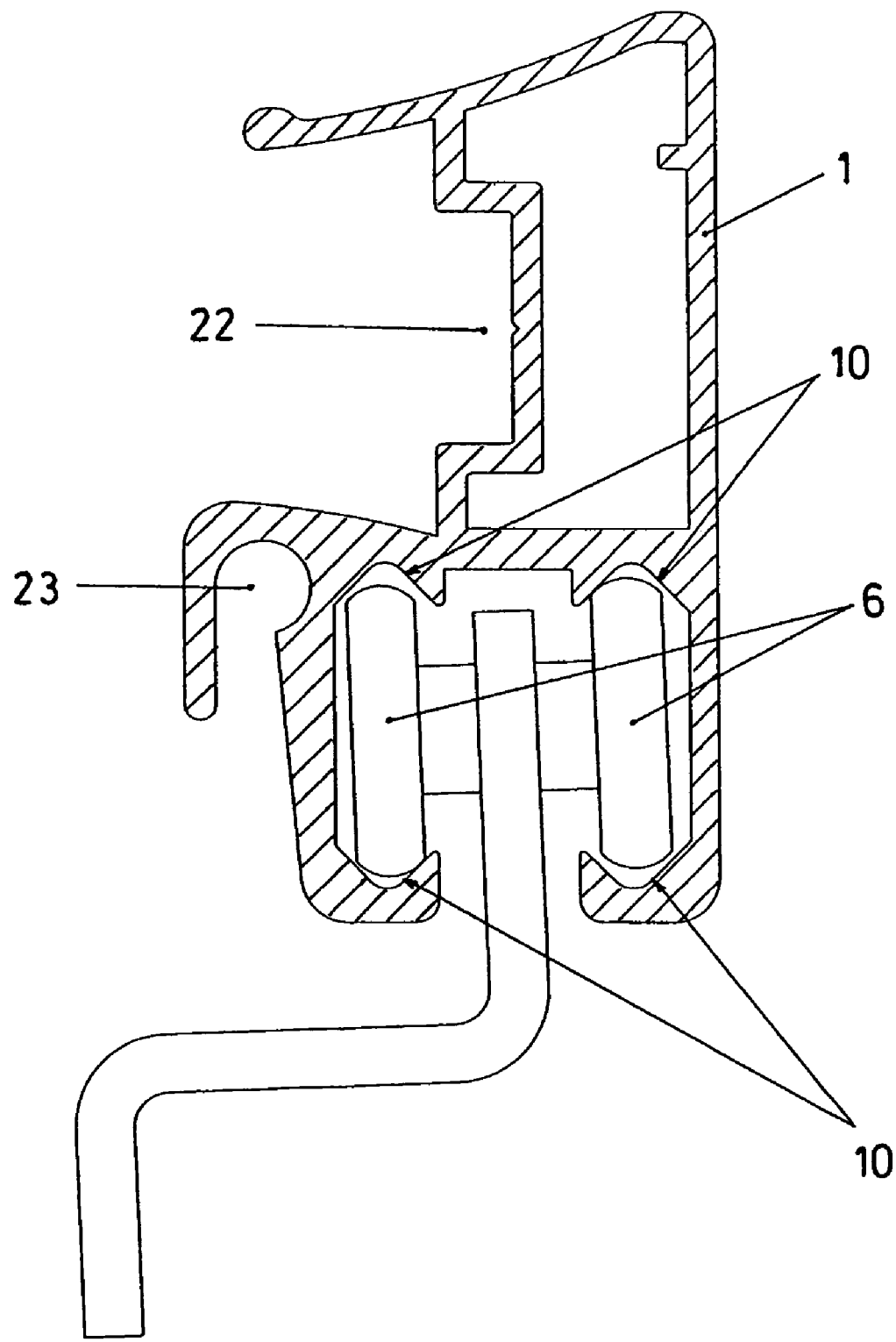
FIG. 21 shows a view like the previous one with the running carriage in a tilted position.

As can be seen in FIGS. 20 and 21, the rails (1) are made up of respective identical profiles, which define inside V-shaped tracks (10) on which the wheels (6) of the carriages form two point supports, causing very little friction, favoring the running.

Figure 15:
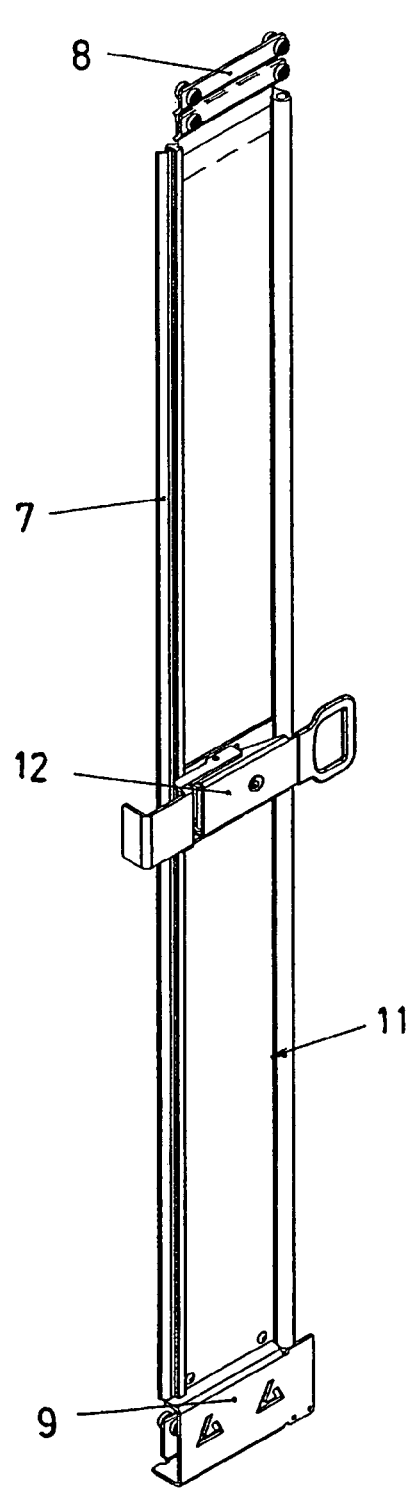
FIG. 15 shows a front perspective view of a terminal profile of the tarp with the corresponding carriages and the closure mechanism.
Figure 16:
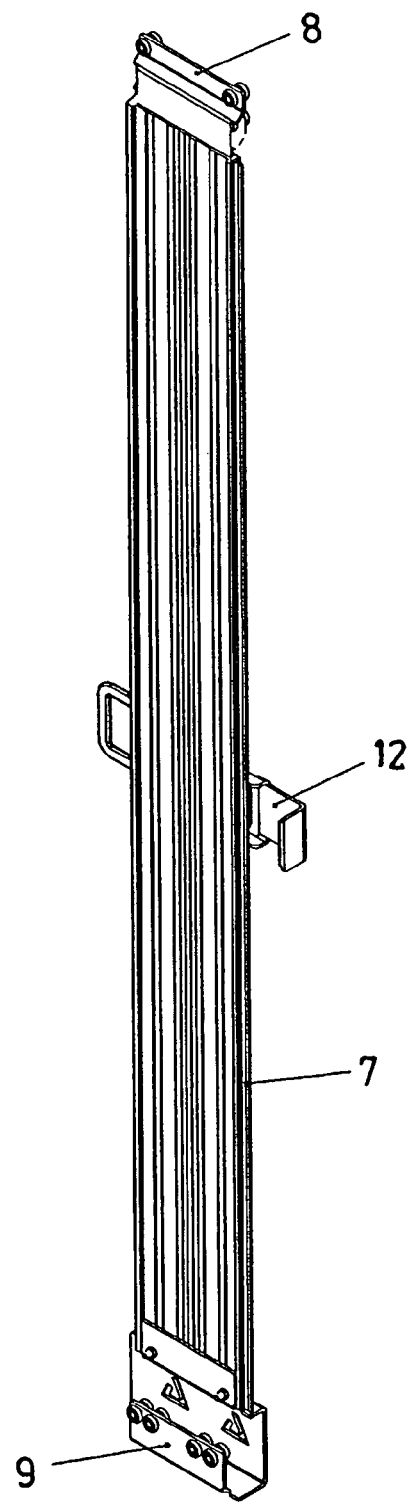
FIG. 16 shows a rear perspective view of the same assembly of the previous figure.
Figure 17:
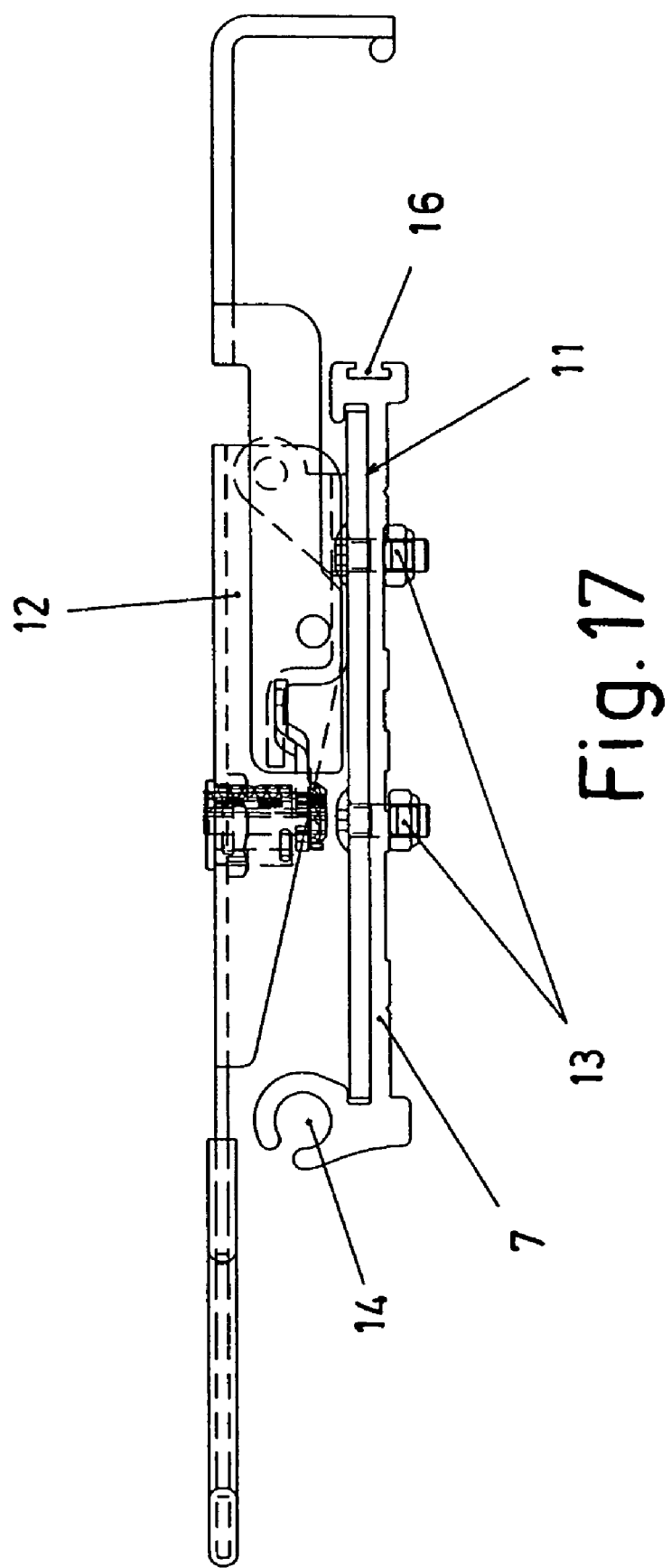
FIG. 17 shows a plan view of a terminal profile of the tarp with the corresponding closure mechanism.
Figure 18:
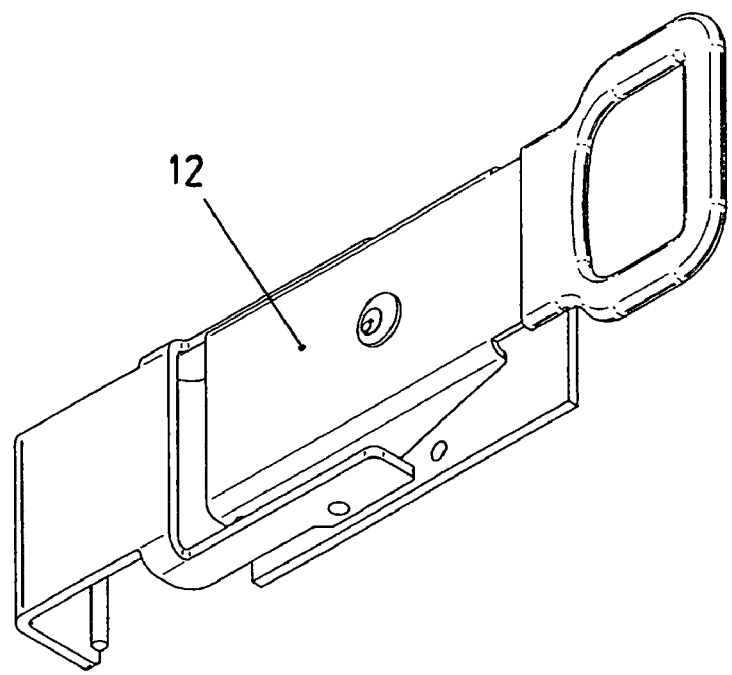
FIG. 18 shows a perspective view of a closure mechanism of the assembly of the invention.
Figure 19:
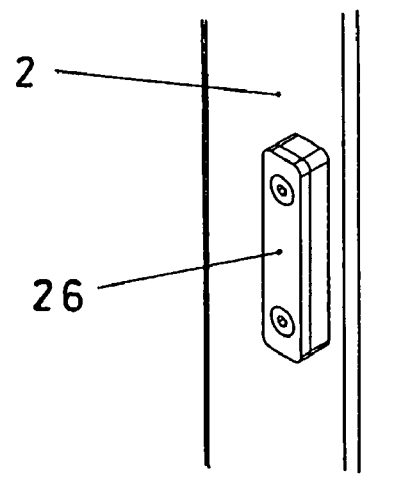
FIG. 19 shows a detail of the arrangement of a latching supplement for tautening the closure.

Incorporated at the ends of the tarp (3) are respective terminal profiles (7) which define a longitudinal groove (11) in which a closure mechanism (12) is arranged fitted, such that said mechanism (12) can be slid in order to place it at the appropriate height, being fixed in the chosen position by means of screws (13), as observed in FIGS. 15 to 17.

Figure 3:
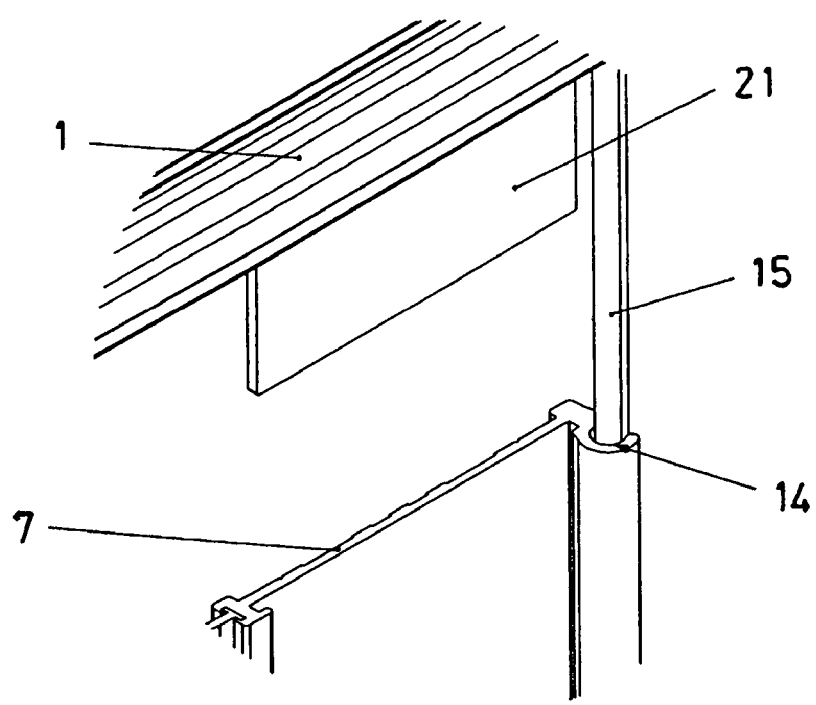
FIG. 3 shows a detail of the connection of the closure tarp with respect to the corresponding terminal profile of one end, in an insertion position of the coupling.
Figure 4:
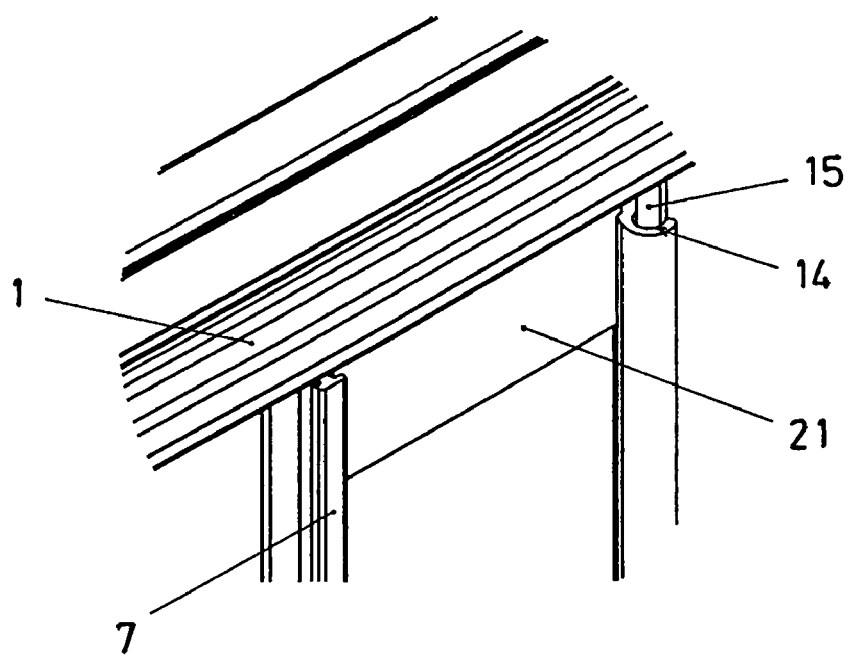
FIG. 4 shows a detail like that of the previous figure in a coupled position.
Figure 5:
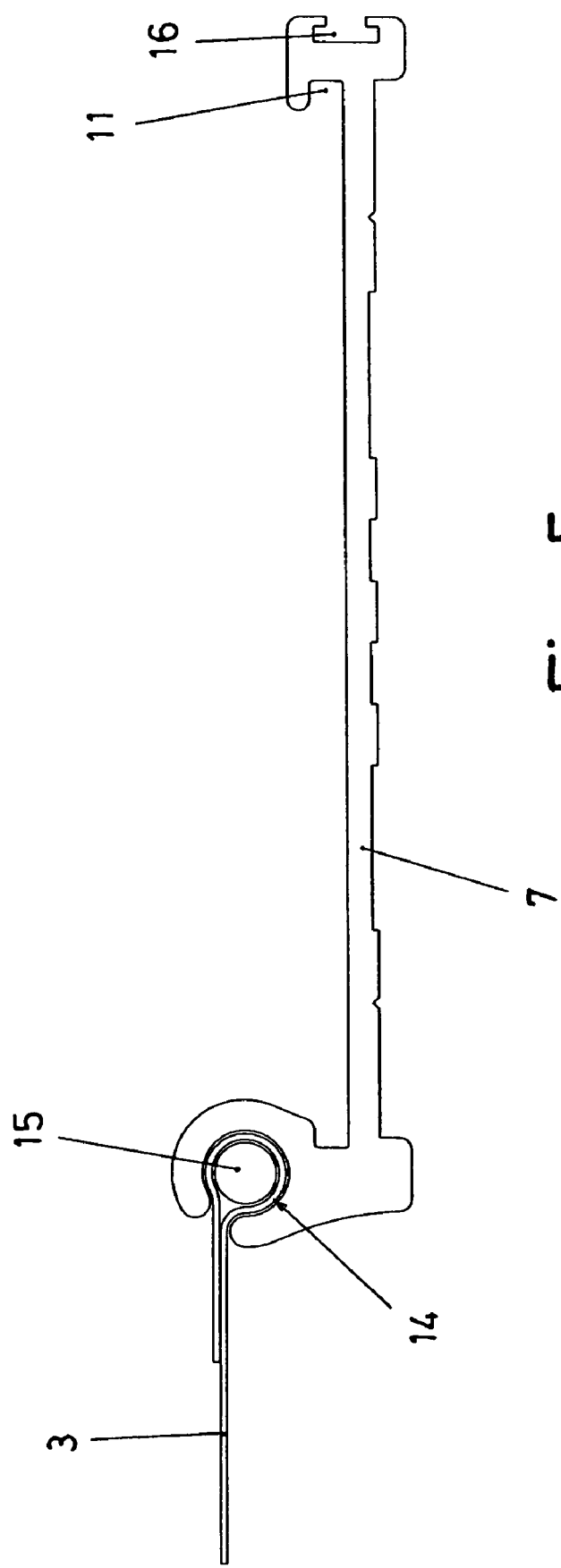
FIG. 5 shows an enlarged plan view of a terminal profile with the tarp coupled.
Figure 6:
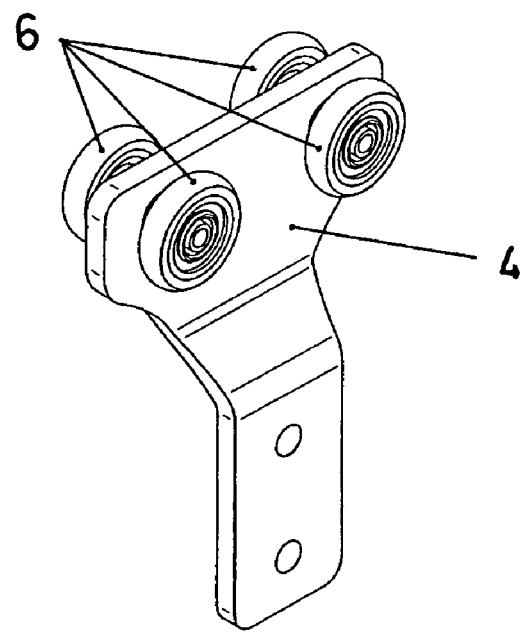
FIG. 6 shows a perspective view of a top carriage of the arrangement of the closure tarp in the assembly.
Figure 7:
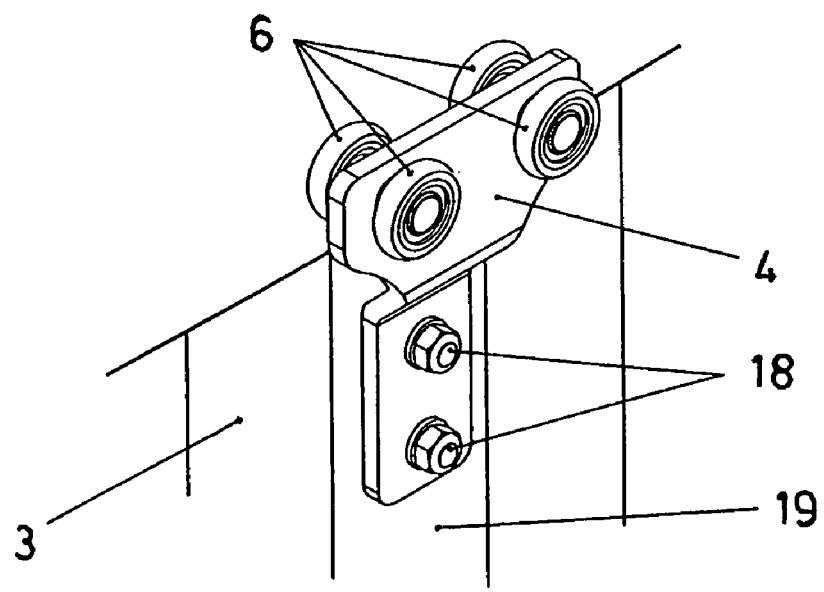
FIG. 7 shows a perspective view of the attachment arrangement of a carriage like the one in the previous figure on the corresponding tarp.
Figure 8:
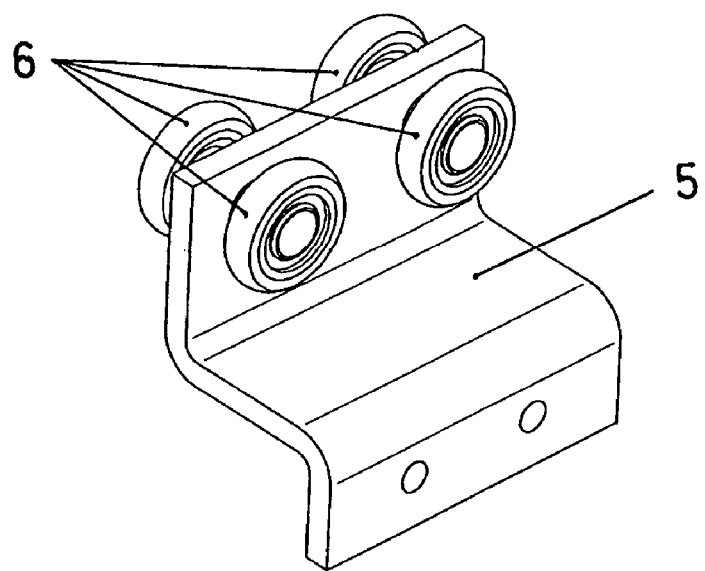
FIG. 8 shows a perspective view of a bottom carriage of the arrangement of the closure tarp in the assembly.
Figure 9:
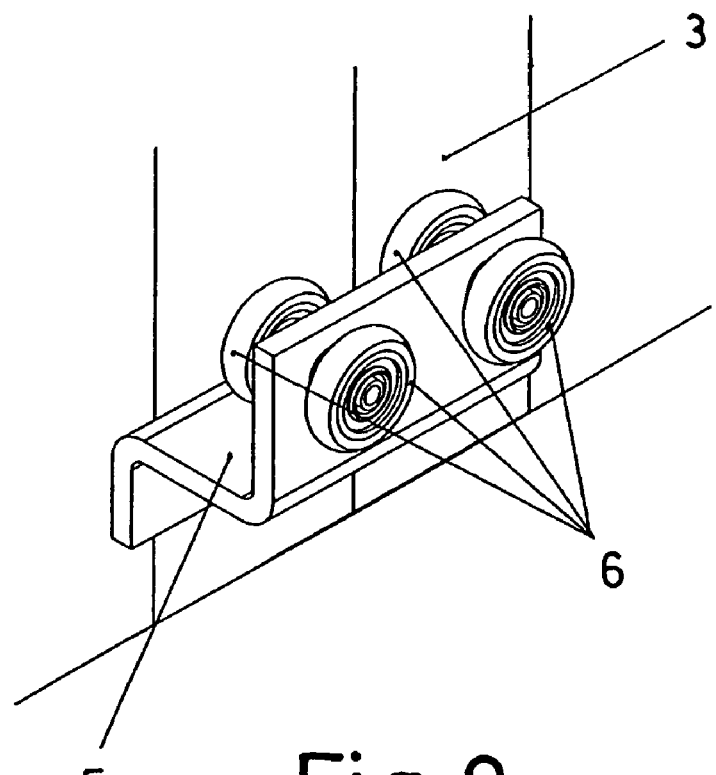
FIG. 9 shows a perspective view of the attachment arrangement of a carriage like the one in the previous figure on the closure tarp.
Figure 10:
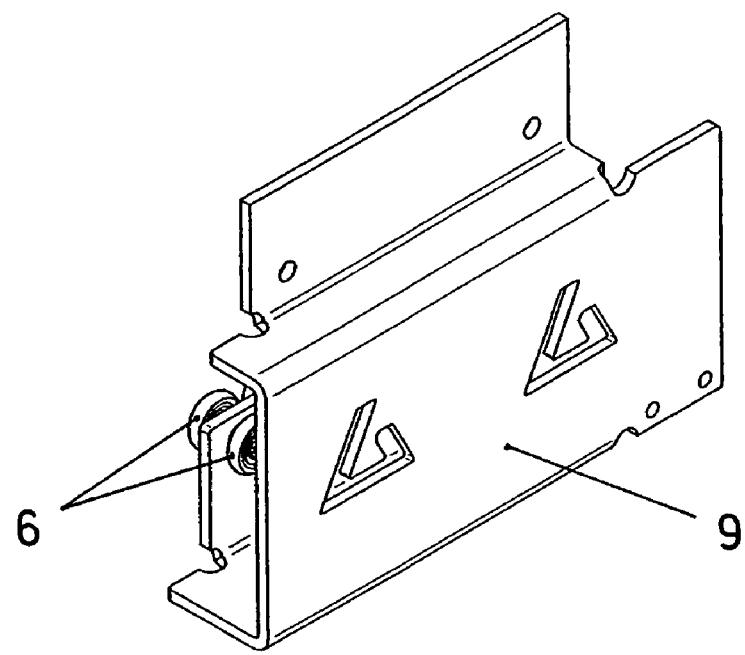
FIG. 10 is a front perspective view of a bottom end carriage of the sliding assembly.
Figure 11:
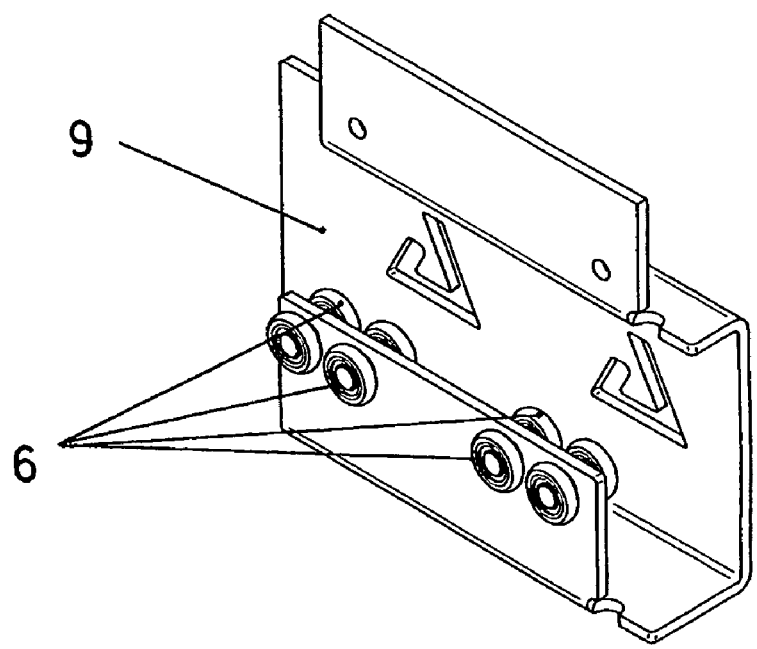
FIG. 11 shows a rear perspective view of the carriage of the previous figure.

Said terminal profiles (7) define on one edge a housing (14) in which the end of the tarp (3) is inserted with a bushing (15) forming a retaining hold, as seen in FIGS. 3, 4, and 5; while on the other edge said profiles (7) have a groove (16) in which an elastic seal (17) intended for forming the closure support is inserted.

Each one of the carriages (4, 5, 8, and 9) has two pairs of wheels (6) facing each other two-wise, by means of which respective supports are formed on the tracks (10) of the rails (1), such that in a normal position, such as that of FIG. 20, all the wheels (6) rest on the tracks (10) of the bottom part, forming an easy-to-run arrangement whereas when a lateral inclination of the corresponding carriage occurs, the wheels (6) of one side rest on the respective bottom track (10), and the wheels (6) of the other side rest on the top track (10) of that side, as depicted in FIG. 21, a good running arrangement thus being maintained without the risk of locking.

Likewise, in the event of a longitudinal inclination of any of the carriages, their wheels (6) of one end are supported on the bottom tracks (10), whereas the wheels (6) of the other end are supported on the top tracks (10), a good running arrangement likewise being maintained, without the occurrence of locking.

With said arrangement, the tarp (3) is directly arranged in a running assembly on the rails (1), by means of the carriages (4 and 5), and in an indirect running assembly through the terminal profiles (7) by means of the carriages (8 and 9); in the assembly of which the carriages (4 and 5) are arranged fixedly joined to the tarp (3) by means of screws (18) or similar means, rigid plates (19) being incorporated in the corresponding areas on the tarp (3) to reinforce these unions.

Figure 12:
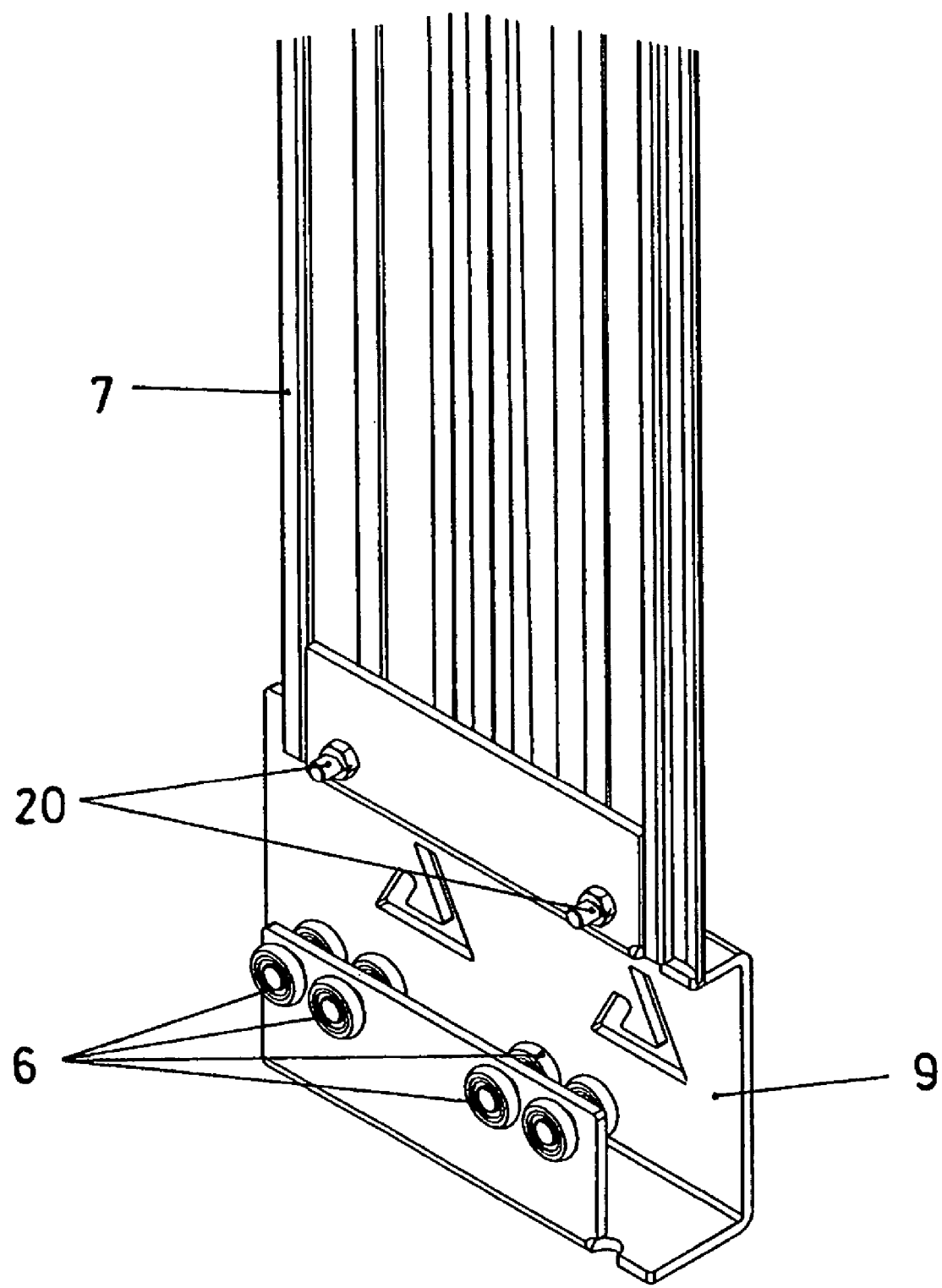
FIG. 12 shows a perspective view of the attachment arrangement of the front carriage on the corresponding terminal profile.
Figure 13:
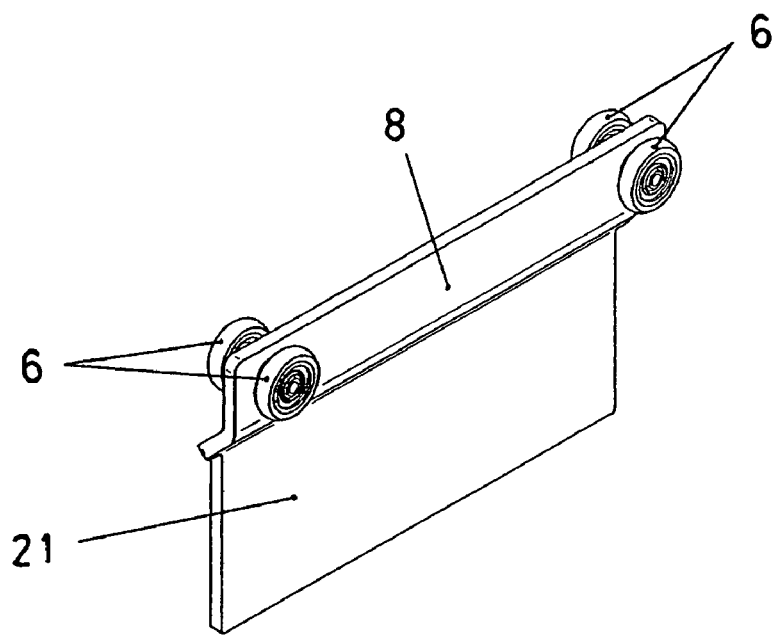
FIG. 13 shows a perspective view of a top end carriage of the sliding assembly.
Figure 14:
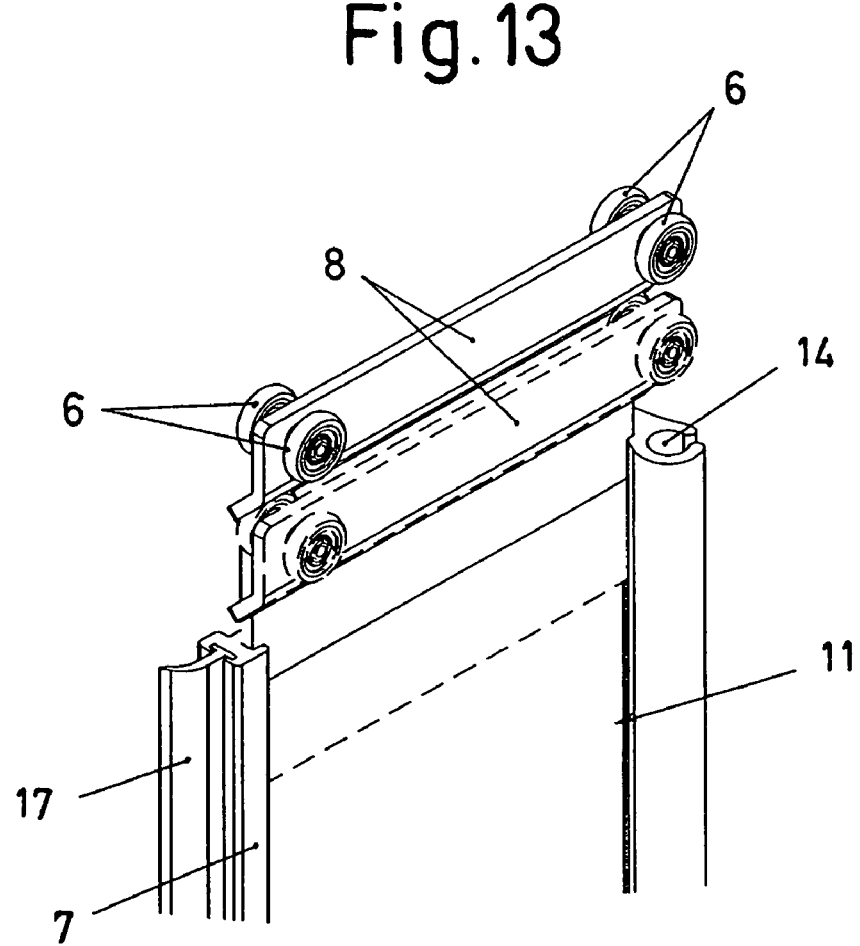
FIG. 14 shows a perspective view of the floating assembly coupling of the front carriage on the corresponding terminal profile.

With respect to the terminal profiles (7), the corresponding bottom carriages (9) are arranged fixed by means of screws (20) or similar means, as shown in FIG. 12; while the top carriages (8) are arranged freely fitted by means of a tab (21) in the groove (11) of the corresponding profile (7), as depicted by FIG. 14, thus defining a floating coupling that allows compensating for the height differences between the rails (1) due to longitudinal warping thereof, whereupon a good arrangement of the sliding of the tarp (3) on said rails (1) is maintained, preventing jams.

The closure mechanisms (12) which are incorporated in the terminal profiles (7) form a retaining latching on the fixed chassis (2) of the application cargo container, such that a pull establishing the tautness of the tarp (3) is defined by means of the latching of the closure mechanisms (12) of the two ends.

However, given that due to the temperature variations and the passing of time the tarp (3) is susceptible to a longitudinal stretching that may cause that tautening is not achieved with the closure latches on the ends, to compensate for the elongation the incorporation of complementary accessories (26) in the latching areas of the closure mechanisms (12) is provided for, whereupon said mechanisms (12) force a greater stretching of the tarp (3), achieving its tautening.

Figure 22:
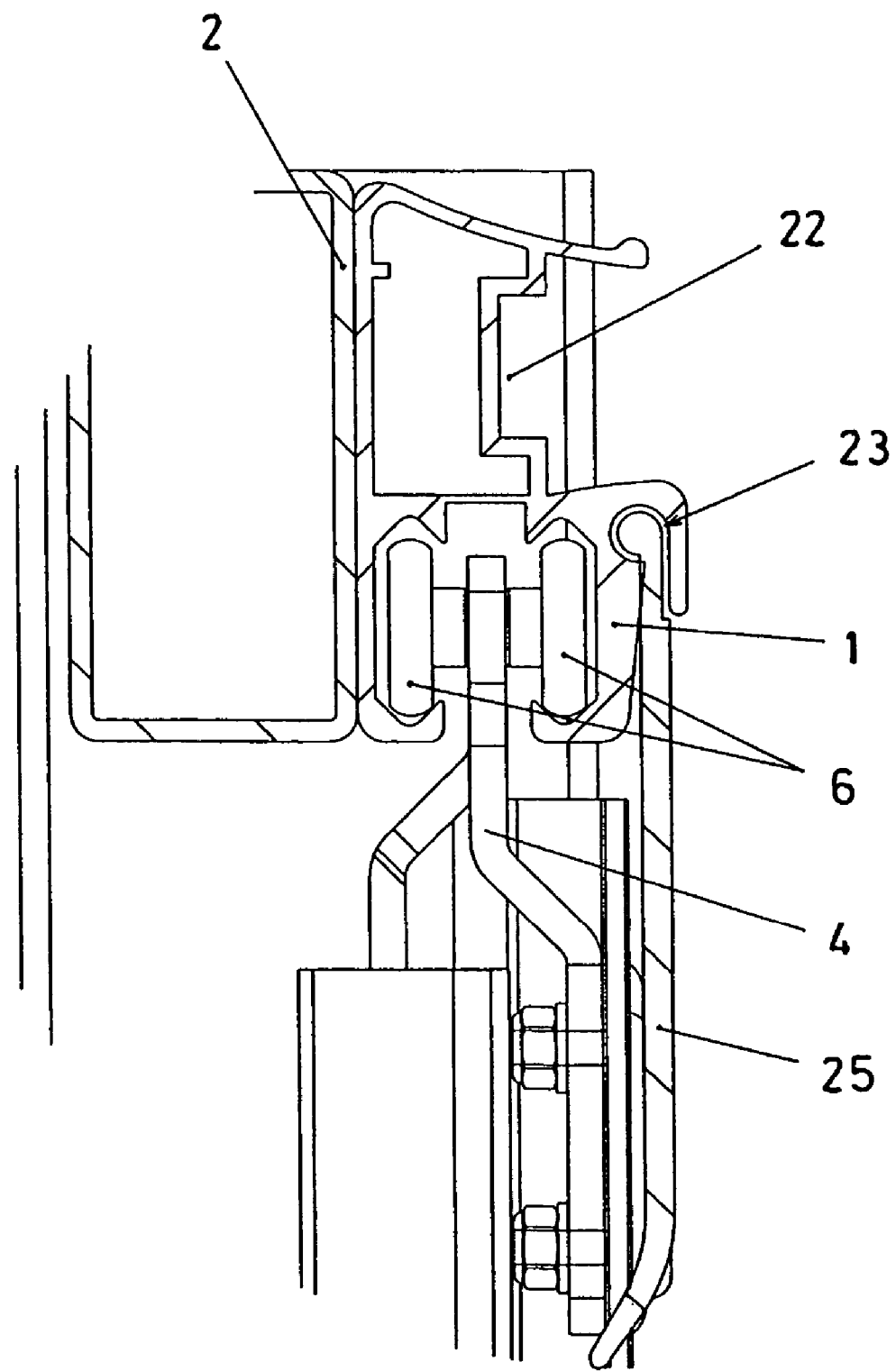
FIG. 22 shows a partial view of the top part of the assembly of the closure, with a cover skirt incorporated in the corresponding rail.
Figure 23:
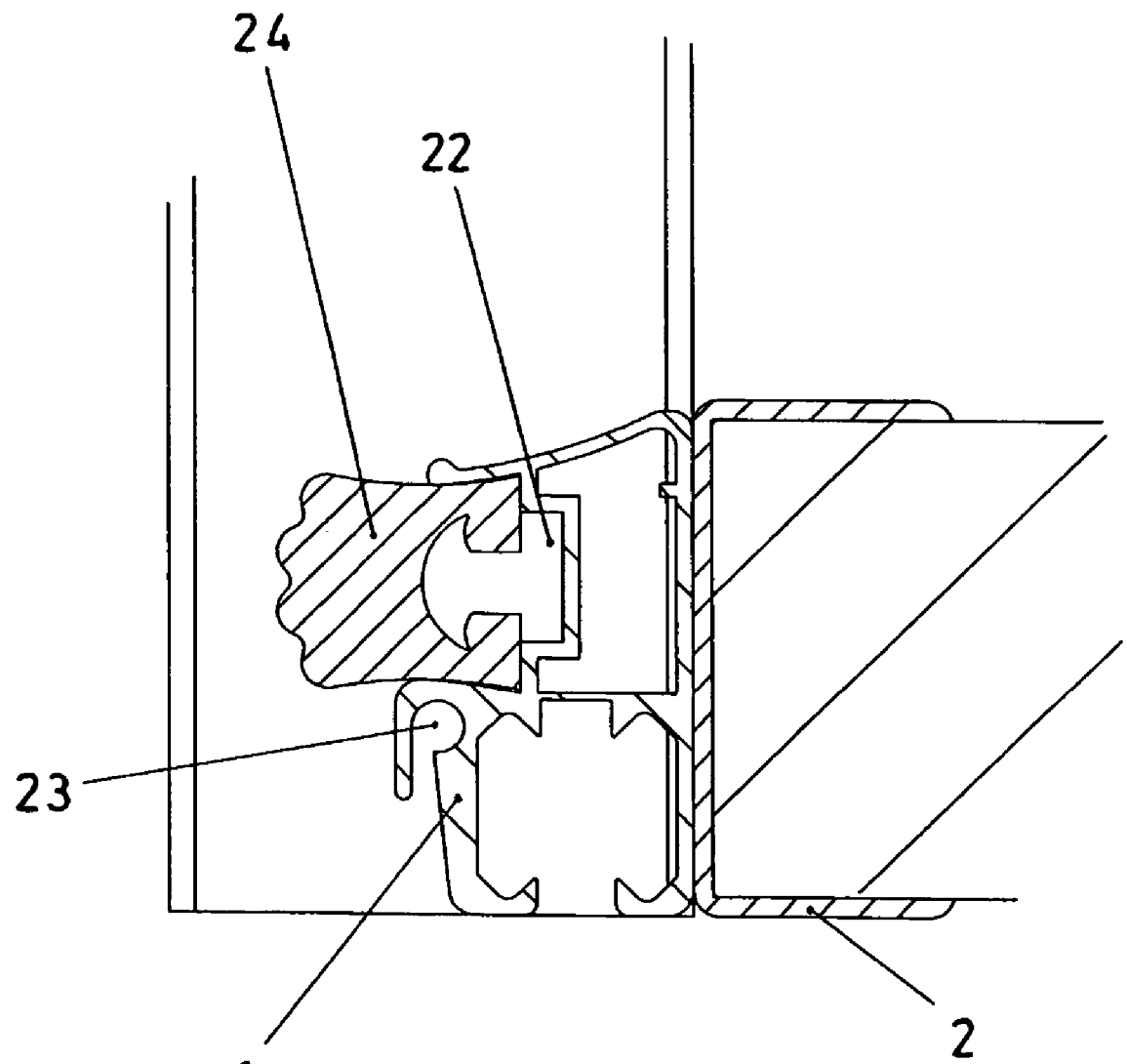
FIG. 23 shows a partial view of the bottom part of the assembly of the closure, with a protective device against blows incorporated in the corresponding rail.

The top and bottom rails (1) are made up of identical profiles, which on the outer lateral side determine a longitudinal groove (22) and a cavity (23), such that in application assemblies, the bottom rail (1) may be supplemented with an buffer protective device (24) that is fitted in the groove (22) of the corresponding profile, as depicted by FIG. 23, while the top rail (1) can be supplemented with a skirt (25) that is fitted in the cavity (23) of the respective profile, as depicted by FIG. 22, to determine a cover that prevents rainwater from entering through the closure assembly into the application cargo container.

The invention claimed is:

1. A folding closure for cargo containers, and comprising a tarp (3) susceptible to folding by moving on longitudinal rails (1), characterized in that the rails (1) are made up of profiles internally defining top and bottom V-shaped tracks (10) on which wheels (6) of top carriages (4) and bottom carriages (5), incorporated on terminal profiles (7) arranged on the ends of the tarp (3), rest in running assembly.

2. A folding closure for cargo containers according to claim 1, characterized in that the wheels (6) of the carriages (4, 5, 8, 9) form two point supports on the tracks (10) of the corresponding rails (1), resting on the bottom track (10) or the top track (10) according to the position of the corresponding carriage.

3. A folding closure for cargo containers according to claim 1, characterized in that the terminal profiles (7) define a longitudinal groove (11) wherein a closure mechanism (12), which can be slid in order to place it at a desired height, is arranged fitted.

4. A folding closure for cargo containers according to claim 1 or 3, characterized in that the top carriages (8) of the ends are incorporated by means of a freely sliding fitting with respect to the corresponding terminal profiles (7), forming a floating assembly of said profiles (7) between the rails (1).

5. A folding closure for cargo containers according to claim 1, characterized in that the top and bottom rails (1) are made up of identical profiles, having on the outer lateral side a longitudinal groove (22) wherein an buffer protective device (24) is incorporated in the bottom rail (1), and a housing cavity (23) wherein a cover skirt (25) is incorporated in the top rail (1).

6. A folding closure for cargo containers according to claim 3, characterized in that a complementary accessory (26), by means of which a spacing of at least one latch of said closure mechanism (12) is defined for tautening the tarp (3), is arranged in latching area of the closure mechanism (12).

* * * * *